US012106005B2

(12) United States Patent
Saita

(10) Patent No.: US 12,106,005 B2
(45) Date of Patent: Oct. 1, 2024

(54) FOLDABLE INFORMATION PROCESSING DEVICE WITH TWO DISPLAY BODIES AND NON-TRANSITORY COMPUTER READABLE MEDIUM, FOR DISPLAYING IMAGES IN FOLDED AND UNFOLDED STATES, INCLUDING DISPLAYING A NOTIFICATION THAT PROVISION INFORMATION EXISTS FOR DISPLAY ON ONE OR MORE SIDES OF THE TWO DISPLAY BODIES

(71) Applicant: FUJIFILM Business Innovation Corp., Tokyo (JP)

(72) Inventor: Takayoshi Saita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 521 days.

(21) Appl. No.: 17/111,517

(22) Filed: Dec. 4, 2020

(65) Prior Publication Data

US 2021/0333831 A1    Oct. 28, 2021

(30) Foreign Application Priority Data

Apr. 23, 2020    (JP) .................................. 2020-076902

(51) Int. Cl.
*G06F 3/04886* (2022.01)
*G06F 3/14* (2006.01)

(52) U.S. Cl.
CPC ........ *G06F 3/1431* (2013.01); *G06F 3/04886* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 8,289,349 | B2 | 10/2012 | Kobayashi |
| 9,798,359 | B2 | 10/2017 | Seo et al. |
| 9,830,075 | B2 * | 11/2017 | Kim ...................... G06F 1/1641 |
| 10,120,415 | B2 | 11/2018 | Seo et al. |
| 10,423,196 | B2 | 9/2019 | Seo et al. |
| 10,631,402 | B2 | 4/2020 | Xiang et al. |
| 2009/0119290 | A1 | 5/2009 | Lee |

(Continued)

FOREIGN PATENT DOCUMENTS

| | | |
|---|---|---|
| EP | 3352044 | 7/2018 |
| JP | 2005310005 | 11/2005 |

(Continued)

OTHER PUBLICATIONS

"Office Action of Japan Counterpart Application", issued on Oct. 31, 2023, with English translation thereof, p. 1-p. 6.

*Primary Examiner* — William L Bashore
*Assistant Examiner* — Gabriel Mercado
(74) *Attorney, Agent, or Firm* — JCIPRNET

(57) ABSTRACT

An information processing device includes a foldable display mechanism including a first display device and a second display device, and a processor configured to, in a case where provision information is proposed by an artificial intelligence assistant while a first image is being displayed in a display region assigned to a first application program on the first display device, execute a display control for displaying a second image indicating the provision information on the second display device.

12 Claims, 7 Drawing Sheets

(56) References Cited

U.S. PATENT DOCUMENTS

| | | | | |
|---|---|---|---|---|
| 2012/0075208 A1* | 3/2012 | Tamiya | ............... | G06F 9/453 |
| | | | | 345/173 |
| 2013/0021266 A1* | 1/2013 | Selim | ............... | G06F 3/04883 |
| | | | | 345/173 |
| 2013/0076683 A1* | 3/2013 | Reeves | ............... | G06T 3/00 |
| | | | | 345/173 |
| 2014/0375596 A1* | 12/2014 | Kim | ............... | G06F 1/1652 |
| | | | | 345/173 |
| 2016/0378270 A1* | 12/2016 | Lee | ............... | G06F 1/1647 |
| | | | | 715/788 |
| 2018/0329718 A1* | 11/2018 | Klein | ............... | G06F 1/1647 |
| 2018/0356904 A1* | 12/2018 | Disano | ............... | G06F 3/0488 |
| 2019/0369671 A1 | 12/2019 | Seo et al. | | |
| 2021/0264905 A1* | 8/2021 | Byun | ............... | G06F 3/04886 |

FOREIGN PATENT DOCUMENTS

| | | |
|---|---|---|
| JP | 2009541893 | 11/2009 |
| JP | 2011033877 | 2/2011 |
| JP | 2011180646 | 9/2011 |
| JP | 2016200515 | 12/2016 |
| JP | 2017510065 | 4/2017 |
| JP | 2017130158 | 7/2017 |
| WO | 2018192426 | 10/2018 |

\* cited by examiner (a)          (b)

FOLDABLE INFORMATION PROCESSING DEVICE WITH TWO DISPLAY BODIES AND NON-TRANSITORY COMPUTER READABLE MEDIUM, FOR DISPLAYING IMAGES IN FOLDED AND UNFOLDED STATES, INCLUDING DISPLAYING A NOTIFICATION THAT PROVISION INFORMATION EXISTS FOR DISPLAY ON ONE OR MORE SIDES OF THE TWO DISPLAY BODIES

CROSS-REFERENCE TO RELATED APPLICATIONS

This application is based on and claims priority under 35 USC 119 from Japanese Patent Application No. 2020-076902 filed Apr. 23, 2020.

BACKGROUND (i) Technical Field

The present disclosure relates to an information processing device and a non-transitory computer readable medium.

(ii) Related Art

Flexible displays using technologies such as organic electroluminescence (EL) and electronic paper are being developed. Recently, mobile terminals having such flexible displays are being sold (see Japanese Translation of PCT International Application Publication No. 2017-510065, Publication of European Patent Application No. 003352044, and International Publication No. 2018/192426).

A smartphone equipped with a flexible display and being foldable may achieve a width that fits into one hand in the folded state, while also being capable of displaying information on a large screen comparable to a tablet in the unfolded state. Among smartphones of this type, there are smartphones capable of displaying information on a screen of smaller area in the folded state compared to the unfolded state. For example, a certain model of foldable smartphone having a large primary display screen folded into the inner side of the smartphone in the folded state also has a smaller sub-display on the face positioned on the outer side of the smartphone in the folded state. Also, a certain model of foldable smartphone having a large primary display folded onto the outer sides of the smartphone in the folded state displays information in the half of the folded primary display that faces the user in the folded state. Furthermore, in these models of smartphones, display contents are changed according to the folded state and the unfolded state. For example, in these smartphones, when the foldable screen is unfolded, the same app that had been displayed on the small half-size screen in the folded state is displayed on the larger full-size screen. Also, some smartphones of this type have a multi-window function that for example divides the unfolded primary display into multiple regions and displays user interface images for different apps respectively in the regions.

In addition, in the device described in Japanese Unexamined Patent Application Publication No. 2017-130158, when a foldable touch panel is unfolded to a flat state, the device displays a user interface (hereinafter referred to as a UI) image on the entire touch panel. Furthermore, when the touch panel is folded by a certain angle, a software keyboard is displayed on one half of the touch panel while a UI image is displayed on the remaining half, thereby providing a use case similar to a laptop PC.

Also, in recent years, software agents called artificial intelligence (AI) assistants have been popularized. An AI assistant, also referred to as a virtual assistant, understands instructions, questions, and other input from a user by using natural language processing (NLP), and proposes to the user services or contents according to the input by using artificial intelligence techniques and machine learning.

In current mainstream practice, an AI assistant in a mobile terminal such as a smartphone may cause a UI image to be displayed in an application program (hereinafter abbreviated to "app") display region (hereinafter referred to as the "app display region", which excludes a region indicating information such as the current time and connectivity status of the communication network, or the AI assistant may cause a UI image to be displayed in full screen over the entire display region of the display.

SUMMARY

In cases where the user interface image of the AI assistant is designed to cover the entire display region of the display or the entire app display region, the user interface image of the AI assistant may sometimes be displayed over a user interface of an application program which the user is using. In such cases, the user interface image displayed in the region assigned for use by the app is covered by the user interface image displayed in the region assigned for use by the AI assistant, and therefore when the user attempts to return to work in the running app, the user needs to operate to return to the user interface image of the app in front again.

Because a foldable mobile terminal has a relatively large display region in the unfolded state, it is conceivable to display the user interface image of the AI assistant in a portion of the display region of the display. However, if even a part of the user interface image of the app is covered by the user interface image of the AI assistant, the usability of the app is reduced.

Aspects of non-limiting embodiments of the present disclosure relate to receiving a visual presentation of information from the AI assistant while also avoiding a reduction in the usability of the app obtained by a large display device of an information processing device having a foldable display mechanism.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a foldable display mechanism including a first display device and a second display device, and a processor configured to, in a case where provision information is proposed by an artificial intelligence assistant while a first image is being displayed in a display region assigned to a first application program on the first display device, execute a display control for displaying a second image indicating the provision information on the second display device.

BRIEF DESCRIPTION OF THE DRAWINGS

An exemplary embodiment of the present disclosure will be described in detail based on the following figures, wherein.

DETAILED DESCRIPTION

Figure 1:
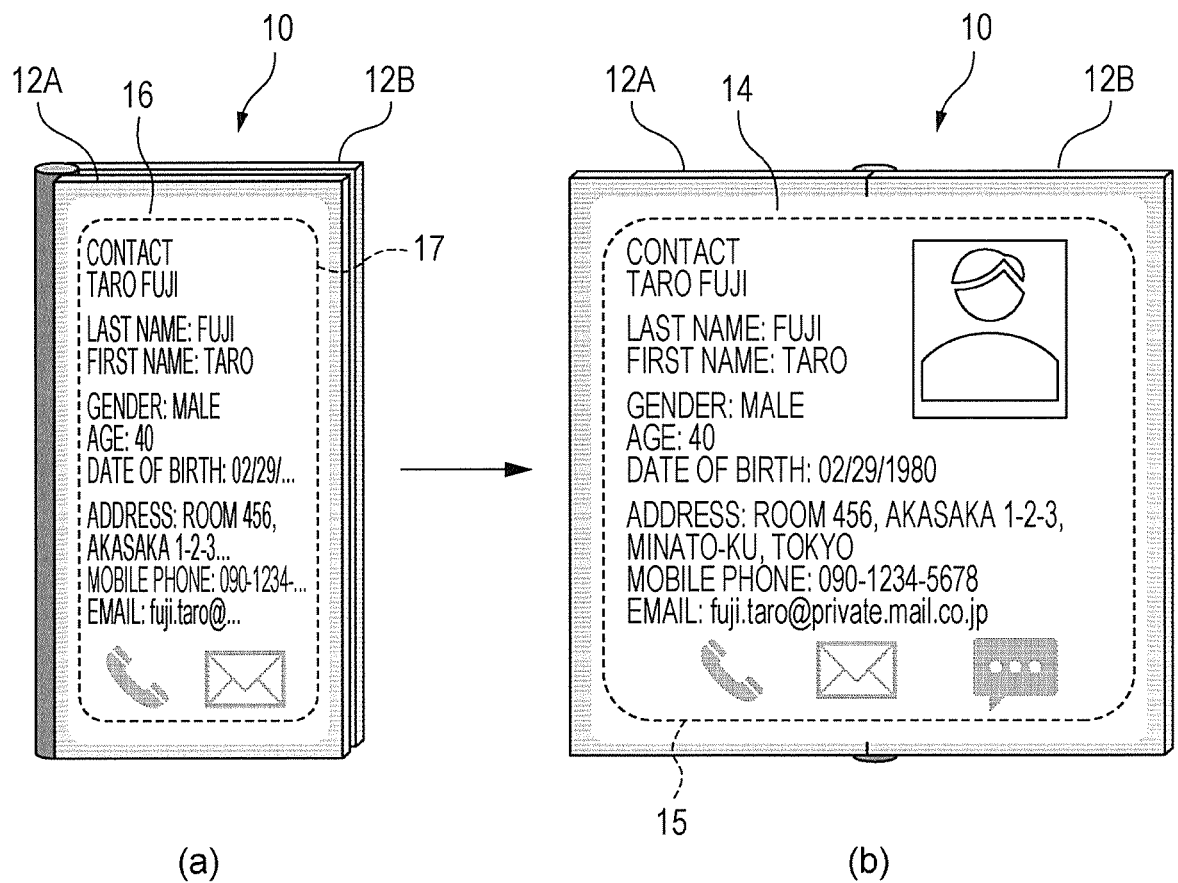
FIG. 1 is a diagram for explaining display control of a foldable information processing device.

FIG. 1 will be referenced to describe an example of display control of a foldable information processing device 10 provided with a large, flexible display. As an example, the information processing device 10 is a mobile information terminal (such as a smartphone or a tablet, for example), but is not limited thereto.

The information processing device 10 exemplified in FIG. 1 is provided with a first body 12A and a second body 12B that are foldably joined to each other. The surfaces on one side of the first body 12A and the second body 12B are provided with a flexible primary display 14 spanning the two bodies. The primary display 14 has a display region of an area nearly equal to the combined area of the surfaces of both the first body 12A and the second body 12B. Also, in this example, a sub-display 16 is provided on the surface on the other side of the first body 12A where the primary display 14 is not provided. The sub-display 16 has an area that fits inside the surface of the first body 12A, and has a display region smaller than the primary display 14. Additionally, the sub-display 16 does not have to be flexible. The primary display 14 and the sub-display 16 are configured as touch panel displays, for example. In this example, the primary display 14 corresponds to a first display device, while the sub-display 16 corresponds to a second display device. Also, the structure that includes the primary display 14 and the sub-display 16 as well as the first body 12A and the second body 12B that support the displays corresponds to a foldable display mechanism.

In FIG. 1, (a) illustrates the information processing device 10 in the folded state, which corresponds to a "closed state" in this embodiment, while (b) illustrates the information processing device 10 in the unfolded state, which corresponds to an "open state" in this embodiment.

The folded state refers to a state in which the display mechanism is folded enough that the display region of the primary display 14 is not sufficiently visible from the outside. In the folded state, the display region of the primary display 14 is not sufficiently visible from the outside of the information processing device 10, but instead, the display region of the sub-display 16 is easily visible. In the folded state illustrated in the example of (a) in FIG. 1, the surfaces on the primary display 14 side of the first body 12A and the second body 12B are touching each other or are close enough to nearly touch each other. In this state, the angle obtained between the planes of the primary display 14 on the first body 12A side and the second body 12B side (in other words, the opening angle of the display mechanism) is substantially 0 degrees. Note that the case of the opening angle being substantially 0 degrees is merely one example of prescribing the closed state. Alternatively, a threshold value greater than 0 degrees may be decided, and the case where the opening angle is inside the range from 0 degrees to the threshold value may be prescribed as the closed state.

The open state is a state in which the display mechanism is unfolded enough that the display region of the primary display 14 is sufficiently visible. In the open state, the display region of the sub-display 16 is not sufficiently visible from the outside of the information processing device 10, but instead, the display region of the primary display 14 is easily visible when the primary display 14 is facing a user of the information processing device 10. As an example, the diagram illustrates the state where the display mechanism is unfolded 180 degrees as the unfolded state, but this is merely one example. For example, a second threshold value less than 180 degrees may be decided, and the case where the opening angle is inside the range from the second threshold value to 180 degrees may be prescribed as the open state.

When the display mechanism is in the closed state, the information processing device 10 displays a screen in the display region of the sub-display 16. In the closed state, the displaying of the screen on the primary display 14 may be stopped (for example, the primary display 14 may be blacked out or turned off). Conversely, when the display mechanism is in the open state, the information processing device 10 displays a screen in the display region of the primary display 14. In the open state, the displaying of the screen in the display region of the sub-display 16 may be stopped.

In the example illustrated in the diagram, a user interface image (hereinafter referred to as a UI image) 17 presenting information about a contact generated by a contacts app is displayed in a display region assigned to the contacts app (the region enclosed by the dashed line around 17) on the sub-display 16 in the closed state. On the UI image 17, information such as the name, address, and phone number of the contact is displayed, and icons such as an icon 20 for calling a phone app and an icon 22 for calling an email app are displayed. From this state, if the user unfolds (or opens) the display mechanism into the open state, the information processing device 10 starts the display on the primary display 14. At this time, a UI image 15 presenting information about the same contact in the same contacts app as the UI image 17 that had been displayed in the closed state is displayed in a display region assigned to the contacts app (the region enclosed by the dashed line around 15) on the primary display 14. Here, because the primary display 14 has a larger display area than the sub-display 16, the program of the app is configured to display more display content on the UI image 15 compared to the UI image 17. For example, in addition to the display content that had been displayed on the UI image 17, information that had not been displayed on the UI image 17, such as an image of a profile photo of the contact and an icon 24 for calling a social media network (also referred to as a social networking service (SNS)) app, is displayed on the UI image 15. The UI image 15 of the app displayed on the primary display 14 is an example of a first UI image, and the display content in the UI image 15 (containing text strings, an image of a profile photo, and an icon group, for example) is an example of the display content of the first UI image.

Note that in the illustrated example, the UI image 15 of the contacts app covers the entire display region of the primary display 14, but this is merely an example. Depending on the settings of the information processing device 10 and an operating system (OS) controlling the information processing device 10, a predetermined area in the display region of the primary display 14, such as a portion at the top or bottom edge for example, may be reserved as a region for displaying information such as the current time, the connectivity status of the communication network, notifications from any apps or system, and app icon groups in some cases. In such cases, the UI image of the app opened by the user is displayed in the remaining region, excluding the region reserved in this way, out of the entire display region of the primary display 14. In this way, the region where the UI image of the app is displayed corresponds to a "display region assigned to a first application program". Note that a "display region" being "assigned to a first application program" is not limited to the case where multiple apps exist and a different display region is assigned to each app, and also includes the case where the same display region is commonly assigned to the multiple apps. In the latter case, when one of the apps is launched, a UI image of the app is displayed in the common display region that remains after excluding the region reserved as described above out of the entire display region of the primary display 14.

Note that in this specification, an app refers to an application program executed by the information processing device 10.

Figure 2:
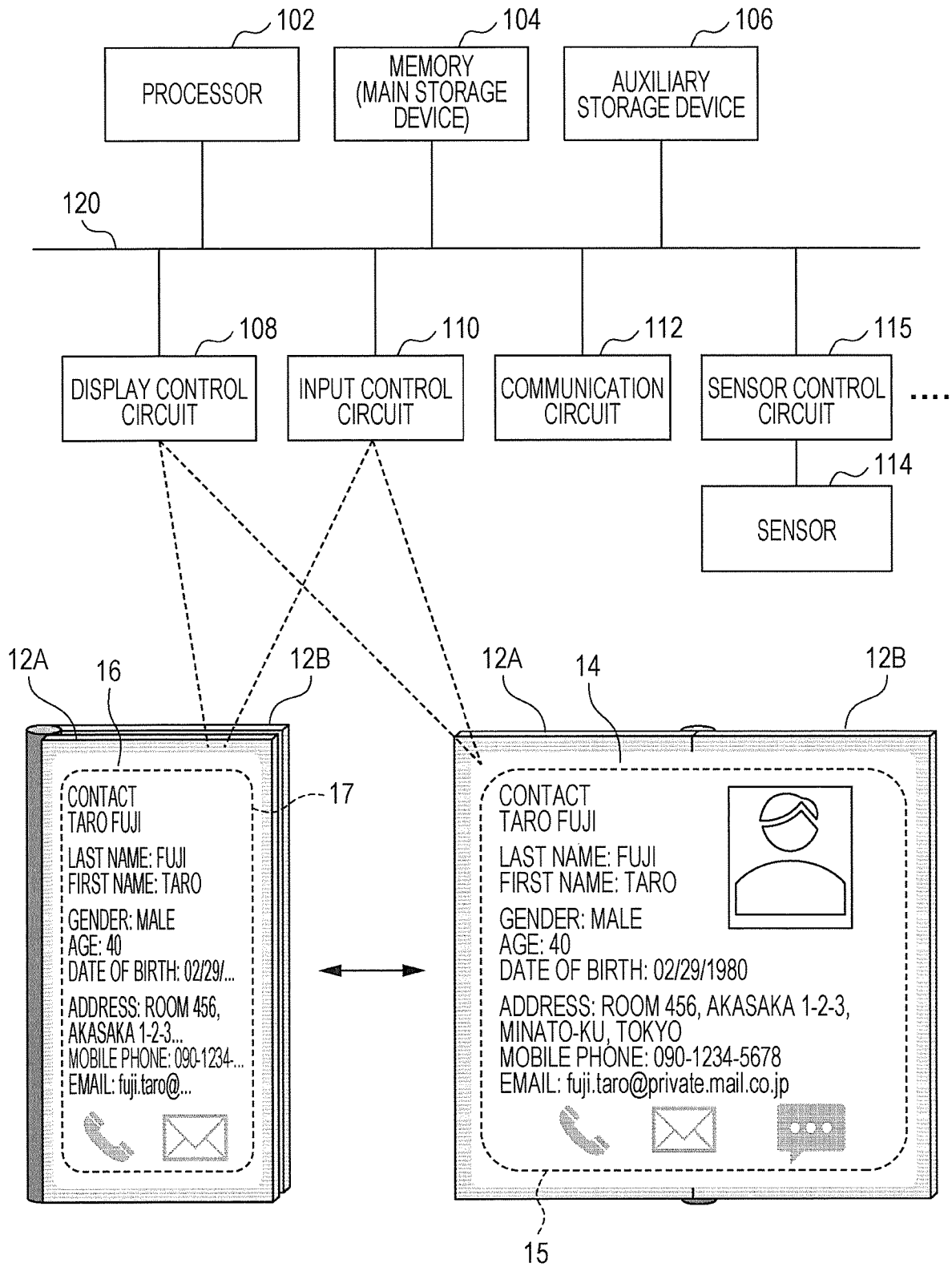
FIG. 2 is a diagram illustrating an example of a hardware configuration of an information processing device.

FIG. 2 illustrates an example of the major parts of a hardware configuration of the information processing device 10. The hardware configuration includes components included in an ordinary computer, such as a processor 102, memory 104 such as random access memory, an auxiliary storage device 106 such as flash memory, a display control circuit 108, and an input control circuit 110. Additionally, components such as a communication circuit 112 and a sensor 114 for detecting the open or closed state of the display mechanism are also included. In the example illustrated in the drawing, the processor 102, the memory 104, the auxiliary storage device 106, the display control circuit 108, the input control circuit 110, the communication circuit 112, and a sensor control circuit 115 that controls the sensor 114 are connected to a bus 120. Through the bus 120, the processor 102 exchanges data with the memory 104, the auxiliary storage device 106, the display control circuit 108, the input control circuit 110, the communication circuit 112, and the sensor control circuit 115. Note that in the example of FIG. 2, all of the components from the processor 102 to the sensor control circuit 115 are connected to the same bus 120 in a flat configuration, but this is merely one example. Alternatively, a hierarchical structure is also possible in which some of the components (for example, a component group including the processor 102) are integrated into a single chip, such as a system-on-a-chip (SoC) for example, and the remaining component group is connected to an external bus connected to the chip.

The processor 102 herein refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

Also, the processor 102 is broad enough to encompass one processor or plural processors in collaboration which are located physically apart from each other but may work cooperatively. The order of operations of the processor 102 is not limited to one described in the exemplary embodiment below, and may be changed.

The OS of the information processing device 10, various apps, and the AI assistant described later or a program that interfaces with an AI assistant on an external server are installed in the auxiliary storage device 106. In addition, a program for controlling the displaying of a provision information image from the AI assistant according to the exemplary embodiment described later is also installed in the auxiliary storage device 106.

The display control circuit 108 controls the screen display on the primary display 14 and the sub-display 16. The input control circuit 110 detects and processes touch input with respect to the touch panels provided in the primary display 14 and the sub-display 16, and conveys the processing result to the processor. The communication circuit 112 executes signal processing by which the information processing device 10 communicates with an external network device by wireless communication or the like.

The sensor 114 for detecting the open or closed state of the display mechanism may be a Hall effect sensor, for example. In this case, one of the first body 12A and the second body 12B is provided with a magnet while the other is provided with the Hall effect sensor, such that when the magnet and the Hall effect sensor approach each other as a result of the display mechanism being folded, the Hall effect sensor detects the magnetism and detects that the display mechanism is in the closed state. However, the sensor for detecting the open or closed state of the display mechanism is not limited to a Hall effect sensor. Any of various types of sensors used in the related art to detect the unfolding or folding of a foldable device may be used as the sensor 114. For example, various sensors such as an infrared sensor, an illuminance sensor, an acceleration sensor, a gyro sensor, and a proximity sensor may be used.

Also, the information processing device 10 may have built-in output devices such as a speaker and a vibration mechanism.

A program for displaying provision information provided by the AI assistant is installed in the information processing device 10.

An AI assistant is a software agent that understands user input and proposes to the user services or contents according to the input. In the exemplary embodiment, among the services provided by the AI assistant, attention will be focused on a service in which the AI assistant generates information to provide to the user (hereinafter referred to as "provision information") according to user input, and provides the provision information as a visual display.

The AI assistant is launched in accordance with an explicit launch instruction from the user, and after being launched, the AI assistant receives input from the user. Also, while a UI image of an app set to use the AI assistant is being displayed on the primary display 14 or the sub-display 16, the AI assistant receives information input into the app by the user. Instead of the explicit launch instruction, the AI assistant can be automatically launched according to a specific condition, such as a condition based on contents the user works on in the app, sounds obtained from a microphone of the smartphone, or the location of the smartphone.

There are a variety of methods by which the user may input information into an app or the AI assistant, including input from a keyboard, touch input with respect to a screen, gesture input by a part of the user's body such as the hands or fingers, voice input, and the input of an image from a camera. Additionally, the AI assistant may also use information about the location of the information processing device 10 carried by the user as input from the user, and such location information may be obtained by using the Global Positioning System (GPS) or an indoor positioning system, for example.

The AI assistant searches information processing device 10 or a device such as a server on a network (for example, the Internet) that the AI assistant is connected to for information related to the content of the user input, and generates provision information to provide to the user on the basis of the information returned by the search. Among the provision information generated by the AI assistant, the visual provision information that is the focus of the exemplary embodiment may include information such as text, still images, moving images, and video with audio.

The program of the AI assistant may be installed in the information processing device 10 itself, or may be installed in a server on a network accessible from the information processing device 10. In the latter case, the information processing device 10 is provided with a program that executes a process of transmitting user input to the AI assistant on the server and a process for displaying provision information returned by the AI assistant in response to the transmission.

Consider the case where visual provision information generated by the AI assistant is proposed to the user while the UI image of an app being executed by the information processing device 10 (hereinafter referred to as the "running app") is being displayed on the primary display 14. One example of the above case is when a setting for using the AI assistant is set in the running app, and the AI assistant generates provision information related to information (for example, text information) input by the user into the UI image. Here, it is assumed that the user is inputting information into the UI image to create a document, for example.

In such a case, if an image for presenting the provision information from the AI assistant (hereinafter referred to as the "provision information image") is displayed on the primary display 14 so as to fully or partially cover the UI image of the running app, some or all of the UI image is obstructed from view, which hinders the input work by the user. Also, even if the provision information image is provided with a button for closing the image such that the UI image of the running app is displayed when the user presses the button, the burden of pressing the button is still imposed on the user.

Accordingly, in such a case, the information processing device 10 according to the exemplary embodiment displays the provision information image from the AI assistant on the sub-display 16 while still displaying the UI image of the running app on the primary display 14. The UI image of the running app displayed on the primary display 14 corresponds to a first user interface image displayed on the first display device, while the provision information image displayed on the sub-display 16 corresponds to a second user interface image displayed on the second display device.

Such control of the displaying of the provision information image will be described further with reference to a specific example illustrated in FIG. 3.

Figure 3:
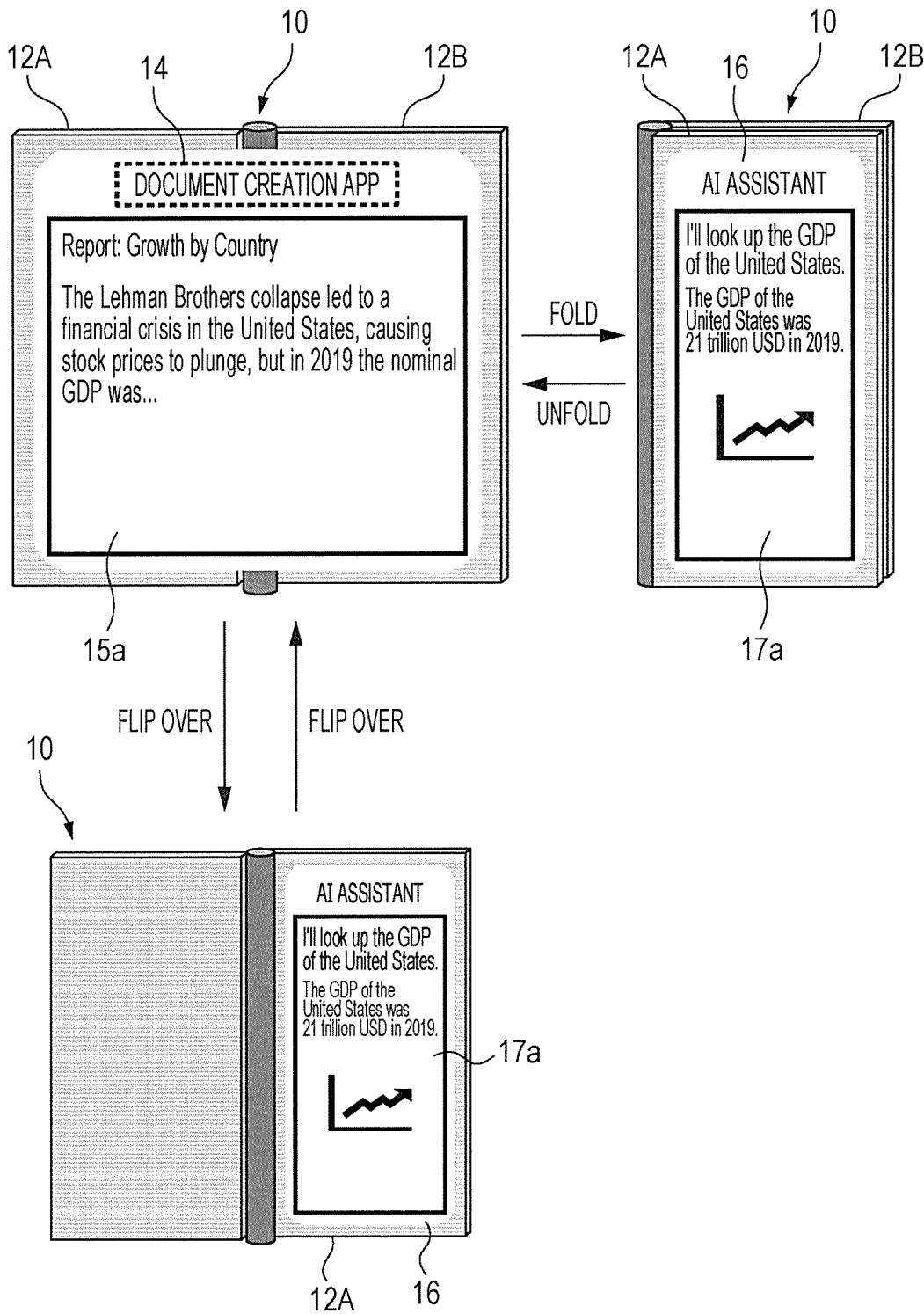
FIG. 3 is a diagram for explaining display control of provision information from an AI assistant in the information processing device according to an exemplary embodiment.

In the example of FIG. 3, a UI image 15a of a document creation app is being displayed on the primary display 14 of the display mechanism in the open state. The document creation app is the current running app. The UI image 15a is a UI image for creating a document, and displays information such as text and images input by the user. It is assumed that the setting for using the AI assistant has already been set in the document creation app.

The AI assistant monitors the data (in the illustrated example, text) input by the user into the UI image 15a displayed on the primary display 14, searches an information source such as the Internet for information related to the data, and generates provision information on the basis of the information obtained as a result of the search. In the illustrated example, the user is in the process of creating a document titled "Report: Growth by Country", and has input two and a half lines of body text. The AI assistant generates provision information to propose to the user by monitoring the content (in this example, text data) input by the user into the UI image 15a, searching for information related to the input content, and editing the information returned by the search. For example, the AI assistant has been trained to search for and generate information judged to be useful with respect to the input content, and generates provision information by using the training results. In the illustrated example, the AI assistant uses commonly available keyword extraction technology to extract the keywords "USA", "2019", and "nominal GDP" from the text in the UI image 15a, and searches for information strongly related to the set of these keywords. The search returns information about the nominal GDP of the USA in the 2019, as well as a strongly related graph of yearly changes in the GDP of the USA. The AI assistant edits the information obtained by the search to generate provision information and the information of a provision information image 17a presenting the provision information.

When the AI assistant generates provision information, the information processing device 10 controls the provision information image 17a indicating the provision information to be displayed on the sub-display 16. This function of display control may also be built into the OS of the information processing device 10, an AI assistant provided in the information processing device 10, a program provided in the information processing device for interfacing with an external AI assistant, or the like. Also, an independent program that is responsible for the display control function may be provided in the information processing device 10.

At this point, if the provision information image 17a is displayed on the sub-display 16 immediately when the provision information is obtained from the AI assistant, information will be displayed on the sub-display 16 that the user is not looking it, needlessly increasing the risk of an information leak. Accordingly, the information processing device 10 displays the provision information image 17a is displayed on the sub-display 16 only in a state in which the user is judged to be looking at the sub-display 16 with high probability. In other words, the information processing device 10 displays the provision information image 17a on the sub-display 16 after determining that the sub-display 16 is seen by the user, that is to say, the sub-display 16 is pointed toward the user's face. Examples of the state in which the user is judged to be looking at the sub-display 16 with high probability include when the user folds the display mechanism of the information processing device 10, or when the user flips over the information processing device 10 in the open state to point the sub-display 16 toward the user. When such a state occurs, the display control function lights up or turns on the sub-display 16 so that the provision information image 17a is visible on the sub-display 16. The state in which the user has folded the display mechanism is determined according to a signal output by the sensor 114, for example. Also, the state in which the user has flipped over the information processing device 10 can be determined on the basis of one or more signals from components such as the acceleration sensor, the camera, or a sensor for face recognition built into the information processing device 10. For example, in the case where the sub-display 16 is determined to be pointed upward from the direction of gravitational acceleration detected by the acceleration sensor, it is judged that the user has flipped over the information processing device 10 and is in a state of looking at the sub-display 16. The user is also judged to be in a state of looking at the sub-display 16 in the case where a camera provided on the surface on the same side as the sub-display 16 detects the user's face from a captured image, or in the case where a sensor for face recognition provided on the same surface recognizes the user's face. Information about the user's face to compare against the image from the camera or the signal from the sensor for face recognition may be preregistered in the information processing device 10.

However, the display mechanism simply being folded does not necessarily mean that the sub-display 16 is pointed toward the user. Consequently, in one example, when the folding of the display mechanism is detected, an additional determination of whether or not the sub-display 16 is pointed toward the user is made on the basis of a signal from the acceleration sensor or the like. If the sub-display 16 is determined to be pointed toward the user, the provision information may be displayed on the sub-display 16.

Here, in the case where the display control function of the information processing device 10 detects that the information processing device 10 has been flipped over and displays the provision information on the sub-display 16, the UI image 15a of the document creation app on the primary display 14 may be hidden from view. To hide the UI image 15a, it is sufficient to black out or turn off the primary display 14, for example. This lowers the risk of a third party peeping the displayed information on the primary display 14 that the user is not looking at.

Figure 5:
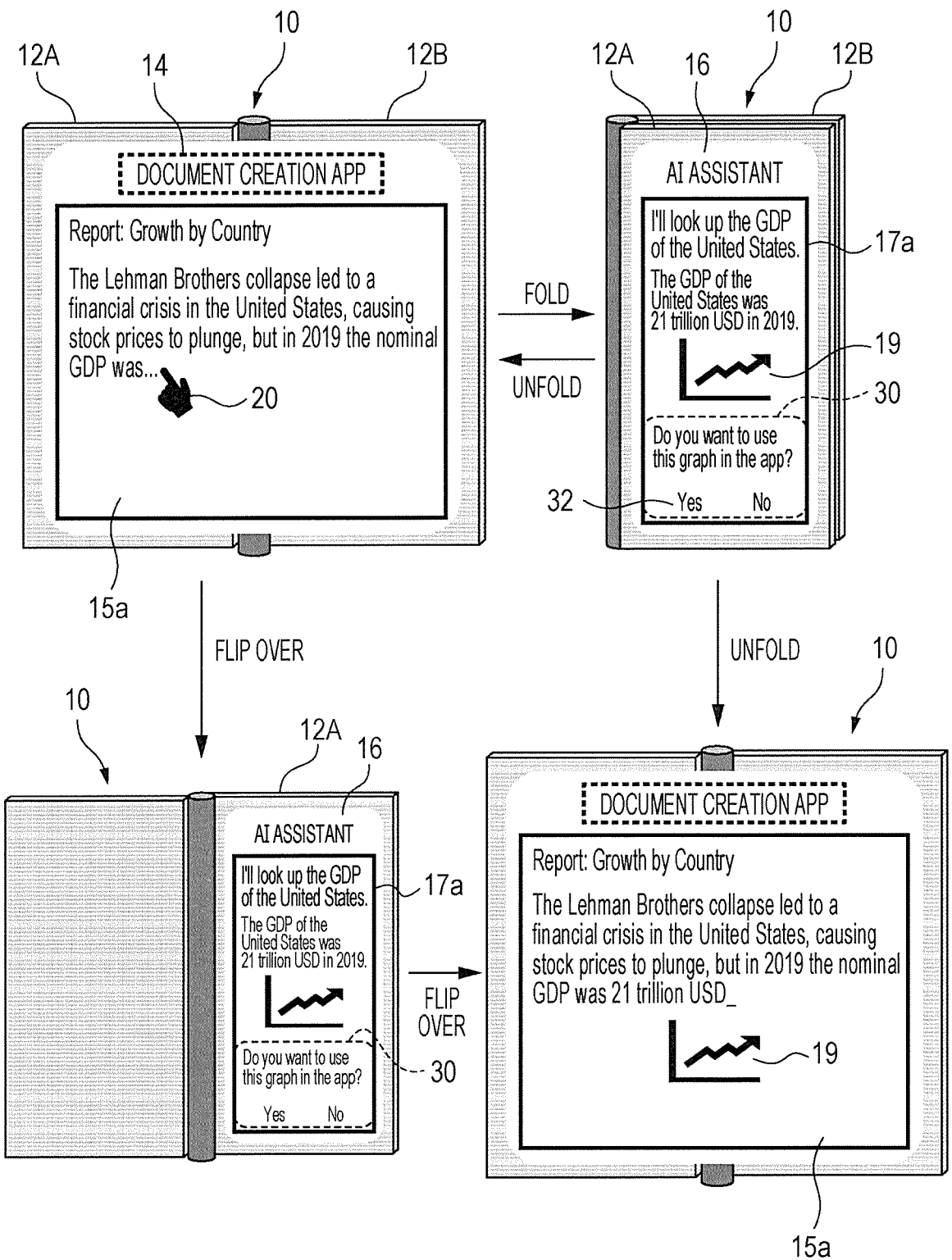
FIG. 5 is a diagram for explaining another example of controlling the displaying of provision information from an AI assistant.

Also, in the case where provision information generated by the AI assistant exists, the information processing device 10 (specifically the function of controlling the displaying of the provision information) may notify the user. The user may be notified by using a vibration function built into the information processing device 10 to cause the information processing device 10 to vibrate in a predetermined pattern. Additionally, the user may also be notified by causing a predetermined sound to be output from a sound output device such as a speaker included in the information processing device 10 or earphones connected to the information processing device 10 in a wired or wireless manner. The user may also be notified by causing a lamp such as a light-emitting diode (LED) provided in the information processing device 10 to emit steady light, blink, or the like. As yet another example of notifying the user, an icon 20 having a predetermined shape indicating that provision information from the AI assistant exists may be displayed in the UI image 15a on the primary display 14, as illustrated in the example of FIG. 5. The icon 20 is assumed to have a small area so as to minimally obscure the display content on the UI image 15a. If the icon 20 has a smaller area than the provision information image 17a, the area of the obscured portion in the UI image 15a is reduced compared to the case of displaying the provision information image 17a on the primary display 14. Additionally, the user may also be notified by a combination of two or more operations from among producing vibration, outputting sound, emitting light from a lamp, and displaying the icon 20 on the UI image 15a.

Through the notification, the user learns that provision information generated by the AI assistant exists, and closes (that is, folds) or flips over the information processing device 10. With this arrangement, the user is able to view the provision information image 17a displayed on the sub-display 16.

Additionally, after the user looks at the provision information image 17a and checks the content of the provision information from the AI assistant, the user unfolds or flips the information processing device 10 back over to look at the UI image 15a on the primary display 14 again and resume the work of document creation.

Figure 4:
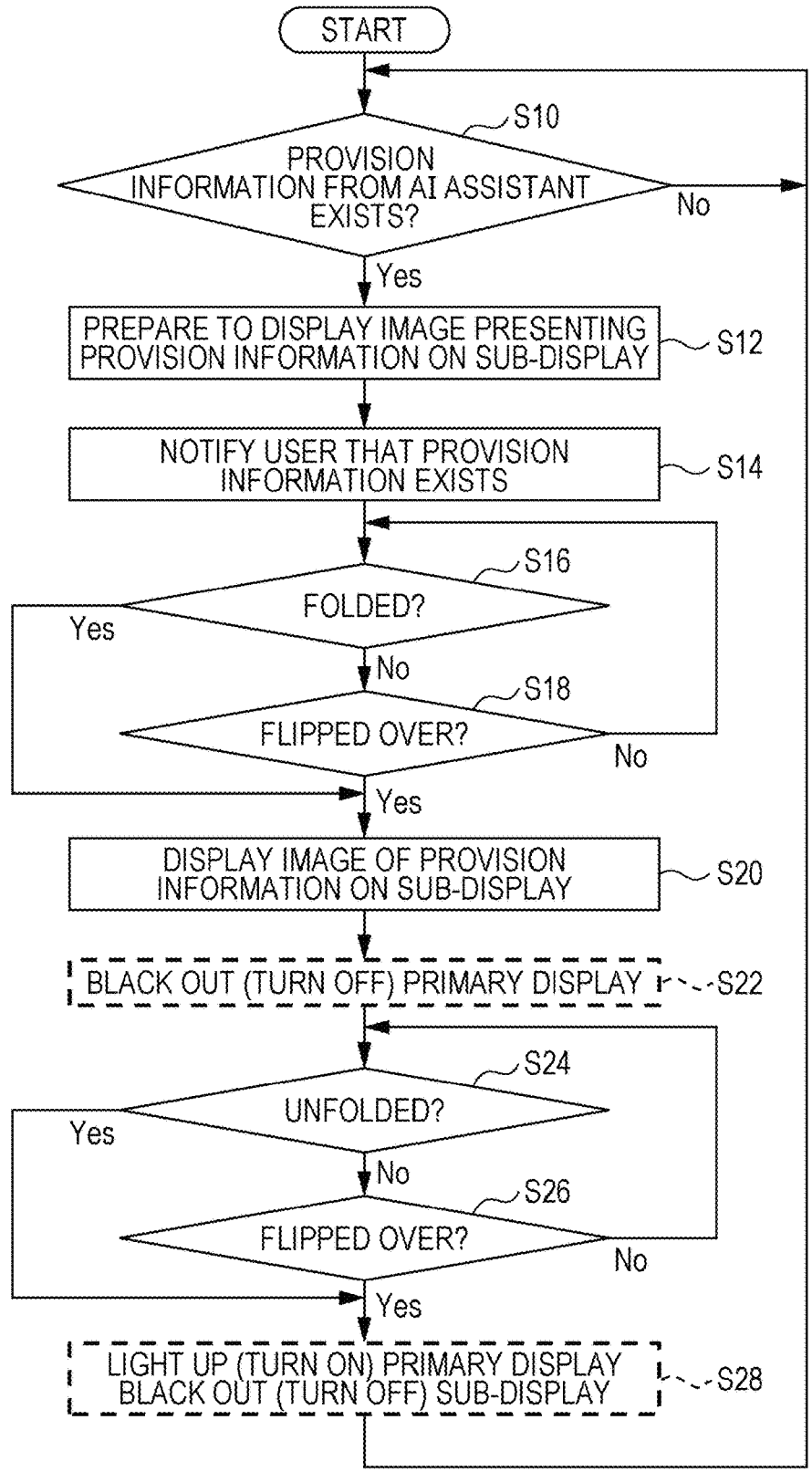
FIG. 4 is a diagram illustrating an example of the procedure of controlling the displaying of provision information from an AI assistant.

A processing procedure executed by the information processing device 10 to control the displaying of an image of provision information as described above is illustrated in the example of FIG. 4. Dash lines in FIG. 4 indicate optional steps.

It is assumed that the information processing device 10 is in the unfolded state and the information processing device 10 (specifically the processor 102) is currently displaying the UI image 15a of a certain app on the primary display 14. Also, the AI assistant running in the background of the app analyzes the content of the user input into the UI image 15a, and if useful information to provide to the user is found on the basis of the analysis result, the AI assistant generates provision information containing the found information.

The information processing device 10 waits for the AI assistant to generate provision information (S10). If the information processing device 10 detects that the AI assistant has generated provision information (the determination result in S10 is Yes), the information processing device 10 prepares to display the provision information image 17a presenting the provision information on the sub-display 16 (S12). For example, the provision information image 17a is drawn in video memory for the sub-display 16 so that the provision information image 17a may be displayed at any time. At this point, the sub-display is blacked out turned off (that is, not displaying) or is displaying a predetermined standby image, and the provision information image 17a is not displayed yet. Next, the information processing device 10 notifies the user that provision information from the AI assistant exists, the notification being issued in a predetermined way such as by producing vibration, outputting sound, or displaying the icon 20 on the screen (S14).

Thereafter, the information processing device 10 waits until the display mechanism is folded or until the display mechanism is flipped over while still in the unfolded state (S16, S18).

If the information processing device 10 detects that the display mechanism has been folded (Yes in S16) or that the display mechanism has been flipped over while still in the unfolded state (Yes in S18), the information processing device 10 displays the provision information image 17a prepared in S12 on the sub-display 16 (S20). Here, the provision information image 17a drawn in advance in video memory for the sub-display 16 is displayed on the sub-display 16, for example. Also, at this time, the information processing device 10 optionally blacks out or turns off the primary display 14 so that the UI image 15a of the app that had been displayed is no longer visible (S22). The display information of the UI image 15a of the app is retained in video memory for the primary display 14 to maintain a state in which the UI image 15a is displayable on the primary display 14 at any time.

Next, the information processing device 10 waits until the display mechanism is unfolded or flipped over (S24, S26). If the information processing device 10 detects that the display mechanism has been unfolded (Yes in S24) or flipped over (Yes in S26), the information processing device 10 lights up or turns on the primary display 14 to display the UI image 15a of the app on the primary display 14. Also, at this time, the information processing device 10 optionally blacks out or turns off the sub-display 16 so that the provision information image 17a is no longer visible (S28). Thereafter, the process by the information processing device 10 returns to S10.

Next, FIG. 5 will be referenced to describe another example of controlling the displaying of provision information from the AI assistant.

In the example of FIG. 5, the icon 20 indicating that provision information from the AI assistant exists is being displayed in the UI image 15a of the document creation app displayed on the primary display 14 of the display mechanism in the unfolded state. The icon 20 is displayed near the portion analyzed by the AI assistant to generate the provision information from among the input content in the UI image 15a. The user's attention may be strongly drawn by causing the icon 20 to blink or by displaying the icon 20 in an easily noticeable color.

The user looks at the display of the icon 20, learns that there is provision information from the AI assistant, and folds the display mechanism or flips over the entire information processing device 10 to point the sub-display 16 toward the user's side. Thereafter, the information processing device 10 displays the provision information image 17a presenting the provision information on the sub-display 16.

In the example of FIG. 5, the icon 20 is displayed, but the display for notifying the user of the existence of provision information is not limited to the icon 20. Instead, for example, a portion of the provision information displayed in a window smaller than the size of the provision information image 17a on the sub-display 16 may be displayed on the UI image 15a as a notifying display.

In the example of FIG. 5, a dialog 30 is displayed in the provision information image 17a. The dialog 30 asks the user whether to insert the information in the provision information image 17a into the UI image 15a of the app displayed on the primary display 14. In the illustrated example, the dialog 30 asks the user whether to use a graph 19 displayed in the provision information image 17a in the UI image 15a of the original app. If the user presses a "Yes" button 32 in the dialog 30, an instruction for adding the graph to an empty region near the icon 20 in the UI image 15a is sent from the information processing device 10 to the document creation app. Following the instruction, the document creation app updates the display content of the UI image 15a, and causes the updated display content to be reflected in the video memory for the primary display 14.

When the user has finished checking the provision information image 17a on the sub-display 16, if the user unfolds the display mechanism or flips the unfolded display mechanism back over so that the primary display 14 is pointed toward the user, the primary display 14 lights up or is turned on again. At this time, the graph 19 has been inserted into the UI image 15a of the document creation app displayed on the primary display 14, in accordance with the user instruction with respect to the dialog 30.

As described above, in the example of FIG. 5, a mechanism is provided such that the provision information or a portion thereof displayed in the provision information image 17a on the sub-display 16 may be added to the input content into the UI image 15a of the running app.

Figure 6:
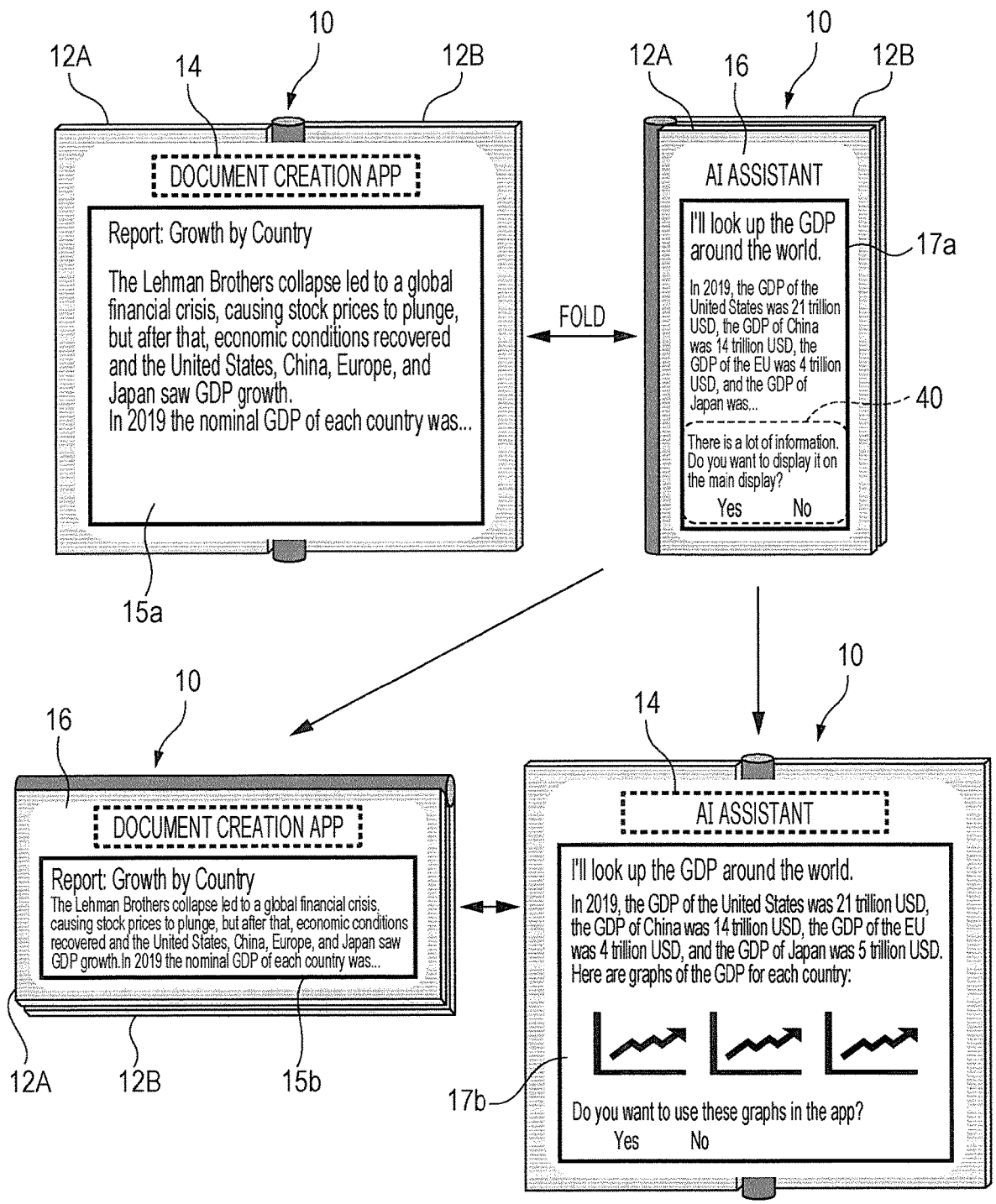
FIG. 6 is a diagram for explaining yet another example of controlling the displaying of provision information from an AI assistant.

Next, FIG. 6 will be referenced to describe yet another example of controlling the displaying of provision information from the AI assistant.

The example in FIG. 6 is for describing the control in the case where the amount of provision information generated by the AI assistant exceeds a threshold value. For example, in the case where the amount of provision information does not fit in the area of the sub-display 16, the user may need to perform an operation such as scrolling the provision information image 17a or turning the page displayed in the provision information image 17a to be able to read all of the provision information. Such an operation impedes usability for the user. Also, even in cases where scrolling or page turning is tolerated to some extent, if a large amount of scrolling or page turning is needed to see all of the provision information, operation becomes burdensome for the user.

Accordingly, in this example, an amount of provision information that is tolerable from the perspective of the user operational burden is set in advance as a threshold value. Additionally, in the case where the amount of provision information generated by the AI assistant exceeds the threshold value, the information processing device 10 displays a provision information image 17b indicating the provision information on the primary display 14. If the provision information image 17b is displayed on the primary display 14, a large amount of provision information is displayable without scrolling or page turning, or alternatively, even if an operation such as scrolling is needed to display all of the provision information, the magnitude of the operation is small. Conversely, in the case where the amount of provision information is lower than the threshold value, the information processing device 10 displays the provision information image 17a on the sub-display 16 similarly to the example of FIG. 3.

However, if the provision information image 17b is suddenly displayed on the primary display 14, the UI image 15a of the app will be hidden totally or partially by the provision information image 17b, which may confuse the user. Accordingly, in the example of FIG. 6, when provision information from the AI assistant exists, the provision information image 17a is displayed on the sub-display 16 first, and in the provision information image 17a, a dialog 40 asking the user whether to display the provision information on the primary display 14 is displayed.

If the user presses a "Yes" button in the dialog 40, the information processing device 10 displays the provision information image 17b presenting the provision information on the primary display 14. In this display process flow, the information processing device 10 draws the provision information image 17b to suit the size of the primary display 14 in the video memory for the primary display 14, and prepares to display the provision information image 17b. If the user unfolds the folded display mechanism or flips over the already-unfolded display mechanism to point the primary display 14 toward the user, the information processing device 10 displays the prepared provision information image 17b on the primary display 14.

If the user presses a "No" button in the dialog 40, the dialog 40 disappears from the provision information image 17a on the sub-display 16, and the provision information is displayed in the provision information image 17a in a scrolling or page-turning format.

Also, in the case of displaying the provision information image 17b on the primary display 14, a UI image 15b indicating the display content of the running app previously displayed on the primary display 14 may also be displayed on the sub-display 16. In this case, if the UI image 15b on the sub-display 16 of the running app has a wide shape, the UI image 15b may be displayed on the sub-display 16 in landscape format, as illustrated in the diagram. In the case where the user viewing the provision information in the provision information image 17b on the primary display 14 wants to check the display content of the UI image 15b of the running app, the user folds or flips over the display mechanism to look at the display on the sub-display 16.

Figure 7:
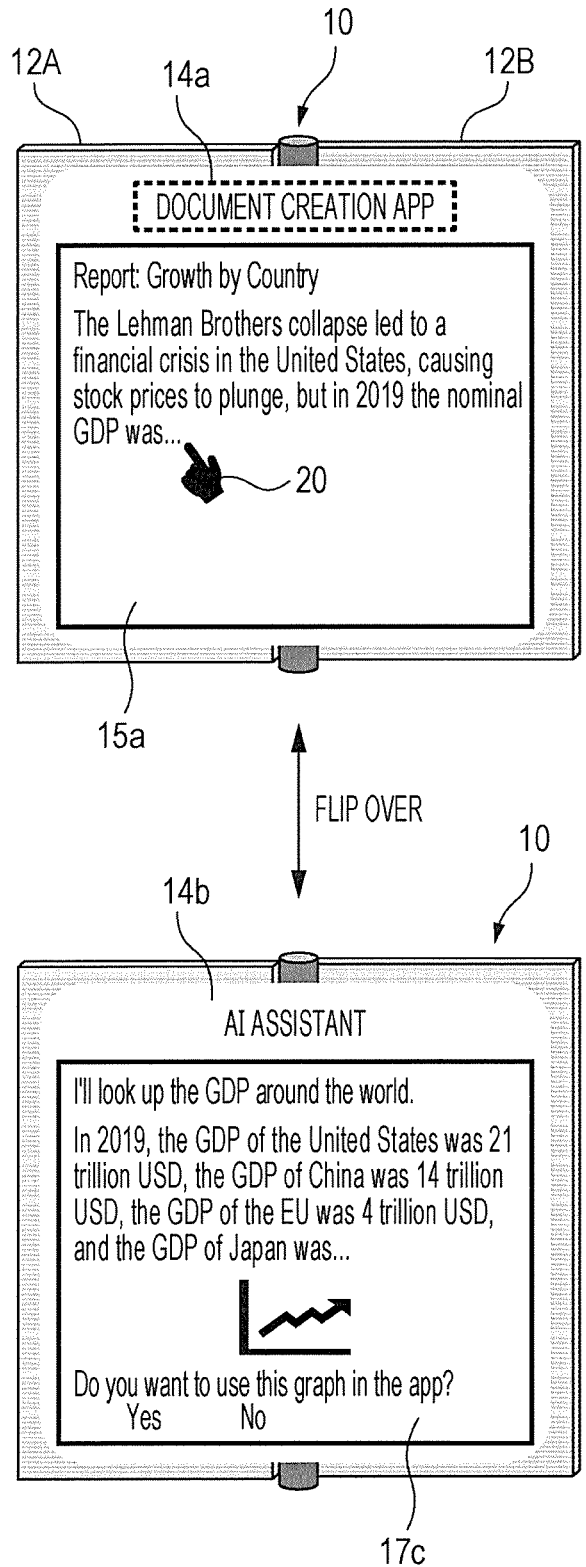
FIG. 7 is a diagram for explaining yet another example of controlling the displaying of provision information from an AI assistant.

Next, FIG. 7 will be referenced to describe yet another example of controlling the displaying of provision information from the AI assistant.

The information processing device 10 in this example is provided with displays 14a and 14b substantially equal in size to the primary display 14 described above on either surface of the display mechanism in the open state. When the display mechanism is folded, a folded half of the surface of either the display 14a or 14b that is on the outside may be made to function as a sub-display.

In this example, in the case where the UI image 15a of the running app is being displayed on the display 14a and provision information is proposed by the AI assistant, the information processing device 10 displays a provision information image 17c on the display 14b on the back side. Instead of displaying the provision information image 17c immediately, the provision information image 17c may also be controlled to be displayed in the case of detecting that the display 14b is pointed toward the user.

In this example, the provision information from the AI assistant is also displayed in a large size.

The foregoing describes an exemplary embodiment of the information processing device 10, but the exemplary embodiment described above is merely for illustrative purposes. Various modification and refinements are possible within the scope of the technical ideas in the present disclosure.

The exemplary embodiment describes a mechanism for controlling the displaying of provision information by taking an example of provision information generated by an AI assistant with respect to user input into the running app (for example, the "document creation app" in the example of FIG. 3). However, the display control according to the exemplary embodiment is not limited to the running app, and is also applicable to the case of displaying provision information generated by an AI assistant with respect to input content the user input directly into the AI assistant. For example, if the user is working with the running app open on the primary display 14, and while doing so, the user launches the AI assistant with a predetermined wake word and uses voice input to ask a question or make a request, the AI assistant generates provision information corresponding to the question or request. At this time, a provision information image presenting the provision information is displayed on the sub-display 16 rather than the primary display 14, thereby avoiding or reducing the obscuring of the UI image 15a.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a foldable display mechanism including a first display device having a first display region displayed on a surface of two display bodies of the foldable display mechanism in an unfolded state and which is capable of being completely hidden from view in a folded state and a second display device having a second display region being at a back side of one of the two display bodies and which is capable of being completely visible when the first display device is in the folded state;
a sensor is configured to:
identify the folded state and the unfolded state of the foldable display mechanism;
and a processor configured to in a case the sensor identifies the foldable display mechanism is unfolded, where a provision information is proposed by an artificial intelligence assistant, while a first image is being displayed in the first display region assigned to a first application program on the first display device, prepare a notification indicating that the provision information exists, control the second display device to display a second image representative of the notification in response to a flipping-over or folding action on the mechanism by a user of the first application program, and control the first display device to display a third image corresponding to the provision information in the first display region in response to an instruction by the user, wherein the provision information refers to information generated by the artificial intelligence assistant and provided to the user based on user input on the first application program.

2. The information processing device according to claim 1, wherein the second display device has a display area equal to or less than a display area of the first display device.

3. The information processing device according to claim 1, wherein the processor is further configured to:
control the second display device to display the second image in a case where the second display device is not pointed toward a user of the information processing device.

4. The information processing device according to claim 1, wherein
the notification is a process of displaying, on top of the first image being displayed on the first display device, an image indicating that the provision information exists, wherein the image is smaller than the second image.

5. The information processing device according to claim 1, wherein
in a case where an amount of the provision information is a threshold value or less, the second image is displayed on the second display device, whereas in a case where the amount of the provision information is greater than the threshold value, the second image is displayed on the first display device.

6. The information processing device according to claim 2, wherein
in a case where an amount of the provision information is a threshold value or less, the second image is displayed on the second display device, whereas in a case where the amount of the provision information is greater than the threshold value, the second image is displayed on the first display device.

7. The information processing device according to claim 5, wherein
in a case of displaying the second image on the first display device, an image indicating a display content of the first image is displayed on the second display device.

8. The information processing device according to claim 6, wherein
in a case of displaying the second image on the first display device, an image indicating a display content of the first image is displayed on the second display device.

9. The information processing device according to claim 5, wherein
in a case where the amount of the provision information is greater than the threshold value, a query image asking the user whether or not to display the provision information on the first display device is displayed on the second display device, and if the user instructs the query image to display the provision information on the first display device, the second image is displayed on the first display device.

10. The information processing device according to claim 6, wherein
in a case where the amount of the provision information is greater than the threshold value, a query image asking the user whether or not to display the provision information on the first display device is displayed on the second display device, and if the user instructs the query image to display the provision information on the first display device, the second image is displayed on the first display device.

11. A non-transitory computer readable medium storing a program causing a computer provided with a sensor, and a foldable display mechanism including a first display device having a first display region displayed on a surface of two display bodies of the foldable display mechanism in an unfolded state and which is capable of being completely hidden from view in a folded state and a second display device having a second display region being at a back side of one of the two display bodies and which is capable of being completely visible when the first display device is in the folded state to execute a process for processing information, the process comprising:
identifying the folded state and the unfolded state of the foldable display mechanism;
and in a case the sensor identifies the foldable display mechanism is unfolded, where a provision information is proposed by an AI assistant, while a first image is being displayed in a the first display region assigned to a first application program on the first display device, preparing a notification indicating that the provision information exists, controlling the second display device to display a second image representative of the notification in response to a flipping-over or folding action on the mechanism by a user of the first application program, and control the first display device to display a third image corresponding to the provision information in the first display region in response to an instruction by the user, wherein the provision information refers to information generated by the artificial intelligence assistant and provided to the user based on user input on the first application program.

12. The non-transitory computer readable medium according to claim 11, wherein the second display device has a display area equal to or less than a display area of the first display device.

* * * * *